(12) United States Patent
Fukaya et al.

(10) Patent No.: US 9,864,240 B2
(45) Date of Patent: Jan. 9, 2018

(54) LIQUID CRYSTAL DISPLAY DEVICE

(71) Applicant: Sharp Kabushiki Kaisha, Osaka (JP)

(72) Inventors: Tetsuo Fukaya, Osaka (JP); Yoshito Hashimoto, Osaka (JP); Yusuke Nishihara, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 15/100,231

(22) PCT Filed: Aug. 27, 2014

(86) PCT No.: PCT/JP2014/072446
§ 371 (c)(1),
(2) Date: May 27, 2016

(87) PCT Pub. No.: WO2015/087585
PCT Pub. Date: Jun. 18, 2015

(65) Prior Publication Data
US 2016/0370664 A1    Dec. 22, 2016

(30) Foreign Application Priority Data

Dec. 9, 2013  (JP) ................................ 2013-254221

(51) Int. Cl.
*G02F 1/1343*  (2006.01)
*G02F 1/1333*  (2006.01)
(Continued)

(52) U.S. Cl.
CPC ...... *G02F 1/134309* (2013.01); *G02F 1/1368* (2013.01); *G02F 1/133345* (2013.01);
(Continued)

(58) Field of Classification Search
CPC ......... G02F 1/134309; G02F 1/133707; G02F 1/136286; G02F 1/1368; G02F 1/133345;
(Continued)

(56) References Cited

U.S. PATENT DOCUMENTS

| 2008/0002126 A1* | 1/2008 | Lim | G02F 1/134309 349/141 |
| 2008/0186440 A1* | 8/2008 | Lim | G02F 1/134363 349/141 |

(Continued)

FOREIGN PATENT DOCUMENTS

| JP | 2009-192932 A | 8/2009 |
| JP | 2011-091279 A | 5/2011 |

(Continued)

*Primary Examiner* — Joseph L Williams
*Assistant Examiner* — Jose M Diaz
(74) *Attorney, Agent, or Firm* — Chen Yoshimura LLP

(57) ABSTRACT

The present invention provides a fringe field switching (FFS) mode liquid crystal display device that makes it possible to improve transmittance when a voltage is applied. The fringe field switching mode liquid crystal display device of the present invention includes: a first substrate; a second substrate arranged facing the first substrate; and a liquid crystal layer sandwiched between the first substrate and the second substrate, wherein the first substrate includes, in order, a plurality of pixel electrodes, an insulating film covering the plurality of pixel electrodes, and a common electrode that is layered on top of the plurality of pixel electrodes and has a plurality of parallel slits formed therein, wherein steps that protrude towards a liquid crystal layer side are formed in the first substrate in at least sides of regions between the plurality of pixel electrodes that are parallel to a lengthwise direction of the plurality of parallel slits, and wherein the common electrode covers at least side faces of the steps.

11 Claims, 10 Drawing Sheets

(51) Int. Cl.
  *G02F 1/1362* (2006.01)
  *G02F 1/1368* (2006.01)
  *G02F 1/1337* (2006.01)
(52) U.S. Cl.
  CPC .. *G02F 1/133707* (2013.01); *G02F 1/136286* (2013.01); *G02F 2001/133776* (2013.01); *G02F 2001/134372* (2013.01); *G02F 2201/121* (2013.01); *G02F 2201/123* (2013.01); *G02F 2202/10* (2013.01)
(58) Field of Classification Search
  CPC ........ G02F 2001/133776; G02F 2001/134372; G02F 2202/10; G02F 2201/121; G02F 2201/123
  See application file for complete search history.

(56) References Cited

U.S. PATENT DOCUMENTS

| | | |
|---|---|---|
| 2009/0207362 A1 | 8/2009 | Nagano et al. |
| 2010/0296042 A1* | 11/2010 | Yonemura ......... G02F 1/134363 349/143 |
| 2012/0133865 A1 | 5/2012 | Yonemura |
| 2012/0268678 A1 | 10/2012 | Tomioka et al. |
| 2013/0063673 A1* | 3/2013 | Choi ................. G02F 1/136227 349/43 |
| 2013/0188106 A1* | 7/2013 | Nishida ............ G02F 1/133512 349/33 |
| 2013/0334534 A1* | 12/2013 | Fujii ................... H01L 27/1248 257/59 |
| 2014/0085356 A1* | 3/2014 | Tanaka ................ G09G 3/3696 345/691 |
| 2015/0029431 A1* | 1/2015 | Fukai ................... G09G 3/3677 349/43 |
| 2017/0104090 A1* | 4/2017 | Koezuka ........... H01L 29/66969 |
| 2017/0108744 A1* | 4/2017 | Tsuei ................ G02F 1/134327 |

FOREIGN PATENT DOCUMENTS

| | | |
|---|---|---|
| JP | 2012-113125 A | 6/2012 |
| JP | 2012-226249 A | 11/2012 |
| JP | 2013-140386 A | 7/2013 |

* cited by examiner

LIQUID CRYSTAL DISPLAY DEVICE

TECHNICAL FIELD

The present invention relates to a liquid crystal display device. More particularly, the present invention relates to a fringe field switching mode (FFS mode) liquid crystal display device that has a two-layer electrode structure for controlling the orientation of liquid crystal molecules using an electric field applied horizontally relative to the principal surface of the substrate.

BACKGROUND ART

In recent years, thin display devices such as liquid crystal display devices have rapidly become widely used. Such devices are widely used not only in television applications but also in e-book devices, e-photo frames, industrial appliances (IA), personal computers (PC), tablet computers, smartphones, and the like. These applications have various performance requirements, and a variety of liquid crystal display modes have been developed.

One liquid crystal display mode that has become more commonly used in recent years is the FFS mode, in which liquid crystal molecules with positive or negative dielectric anisotropy are aligned horizontally relative to the principal surface of a substrate. Display configurations such as those described below that utilize this type of liquid crystal display mode and exhibit improved transmittance are currently being researched.

One known example of such a technology is the liquid crystal display device disclosed in Patent Documents 1 and 2, for example, in which even the interior regions of contact holes for connecting pixel electrodes to the source electrodes of thin-film transistor elements are part of the transmissive region for forming images.

RELATED ART DOCUMENTS

Patent Documents

Patent Document 1: Japanese Patent Application Laid-Open Publication No. 2012-226249
Patent Document 2: Japanese Patent Application Laid-Open Publication No. 2013-140386

SUMMARY OF THE INVENTION

Problems to be Solved by the Invention

In conventional FFS mode liquid crystal display devices, sufficient transmittance cannot typically be achieved when applying a voltage to display a high color level state (such as the white display state), and the effects of this problem become increasingly pronounced in higher-resolution displays. Next, this problem will be described in more detail.

FIG. 9 is a plan view schematically illustrating a pixel in a conventional FFS mode liquid crystal display device. As illustrated in FIG. 9, this pixel 102 includes gate bus lines 103; source bus lines 104 that run in a direction that intersects with the gate bus lines 103; a thin-film transistor element 105 that is electrically connected to one of the gate bus lines 103 and one of the source bus lines 104; an insulating film 109a that covers the gate bus lines 103, the source bus lines 104, and the thin-film transistor element 105; a plate-shaped pixel electrode 110 that is formed on top of the insulating film 109a and is electrically connected to the thin-film transistor element 105 via a contact hole 108; and a common electrode 111 that is layered on top of the pixel electrode 110 and has parallel slits 112a and 112b formed therein. The thin-film transistor element 105 includes a source electrode 106 that is electrically connected to one of the source bus lines 104 and a semiconductor layer 107. The direction in which the source bus lines 104 run is parallel to the lengthwise direction of the parallel slits 112a and 112b formed in the common electrode 111 (the vertical direction in FIG. 9).

In the pixel 102, a voltage supplied from one of the source bus lines 104 is applied to the pixel electrode 110 via the source electrode 106, the semiconductor layer 107, and the contact hole 108 at a timing selected by the gate bus line 103.

Note that FIG. 9 only illustrates the configuration of a lower substrate 113b (described later). However, in reality an upper substrate 114 is arranged facing the lower substrate 113b. Moreover, an insulating film 109b (described later) is also formed covering the pixel electrode 110 and the insulating film 109a. However, this insulating film 109b is transparent and is therefore not depicted in FIG. 9.

FIG. 10 is a cross-sectional view schematically illustrating a cross section taken along line a-a' in FIG. 9. As illustrated in FIG. 10, a liquid crystal display device 101b includes the lower substrate 113b, the upper substrate 114 arranged facing the lower substrate 113b, and a liquid crystal layer 115 that is sandwiched between the lower substrate 113b and the upper substrate 114. The lower substrate 113b includes a supporting substrate 116, the source bus lines 104 that are formed on the liquid crystal layer 115-side surface of the supporting substrate 116, the insulating film 109a that covers the source bus lines 104, the pixel electrode 110 that is arranged on the liquid crystal layer 115-side surface of the insulating film 109a, the insulating film 109b that covers the pixel electrode 110 and the insulating film 109a, and the common electrode 111 that is arranged on the liquid crystal layer 115-side surface of the insulating film 109b. Parallel slits 112a and 112b are formed in the common electrode 111. The upper substrate 114 includes a color filter, a black matrix, and the like that are arranged as appropriate on the surface of a supporting substrate. Furthermore, alignment films (not illustrated in the figure) are formed on the liquid crystal layer 115-side surfaces of the lower substrate 113b and the upper substrate 114. These alignment films make the liquid crystal molecules in the liquid crystal layer 115 align horizontally relative to the liquid crystal layer 115-side surfaces of the lower substrate 113b and the upper substrate 114 when no voltage is applied. Note that FIG. 10 only illustrates a single pixel. In reality, however, a plurality of such pixels are arranged in the horizontal direction.

When a voltage is applied to the configuration illustrated in FIG. 10, a horizontal electric field (horizontal relative to the liquid crystal layer 115-side surface of the lower substrate 113b) of sufficient magnitude cannot be applied spanning all the way to the edge regions AR1 (regions arranged between the pixel electrodes of adjacent pixels) of the pixel. As a result, the orientation of the liquid crystal molecules does not change sufficiently, thereby making it impossible to achieve improved transmittance in the affected areas. Moreover, as display resolutions become increasingly higher, this insufficient transmittance becomes increasingly pronounced in the overall pixel. Furthermore, this same problem manifests in the same way even when the direction in which the gate bus lines 103 run is parallel to the lengthwise direction of the parallel slits 112a and 112b formed in the common electrode 111.

Therefore, in conventional FFS mode liquid crystal display devices, there is still room for improvement of the transmittance when a voltage is applied.

The abovementioned Patent Documents 1 and 2 disclose technologies for providing liquid crystal display devices that exhibit improved transmittance and screen brightness. However, the inventions disclosed in Patent Documents 1 and 2 focus on the contact holes rather than the insufficient transmittance of the edge regions AR1 of the pixel as illustrated in FIG. 10. Therefore, there is still room for improvement of the problem described above.

The present invention was made in light of the foregoing and aims to provide an FFS mode liquid crystal display device that makes it possible to improve the transmittance when a voltage is applied.

Means for Solving the Problems

The inventors performed various research on liquid crystal display devices that could make it possible to improve the transmittance when a voltage is applied in an FFS mode liquid crystal display device, focusing on configurations in which steps that protrude towards a liquid crystal layer side are formed in at least sides of regions between the pixel electrodes of adjacent pixels that are parallel to the lengthwise direction of a plurality of parallel slits formed in a common electrode, and in which the common electrode covers at least side faces of the steps. The inventors found that in this type of configuration, a horizontal electric field was concentrated at the side faces of the steps when a voltage was applied, and the horizontal electric field extended all the way to edge regions of the pixels, thereby causing a sufficient change in the orientation of the liquid crystal molecules and making it possible to improve transmittance in those regions. The inventors predicted that this could effectively solve the abovementioned problems and arrived at the present invention.

In other words, one aspect of the present invention may be a fringe field switching mode liquid crystal display device, including: a first substrate; a second substrate facing the first substrate; and a liquid crystal layer sandwiched between the first substrate and the second substrate, wherein the first substrate includes, in order, a plurality of pixel electrodes, an insulating film covering the plurality of pixel electrodes, and a common electrode layered over the plurality of pixel electrodes and having a plurality of parallel slits formed therein, wherein a step that protrudes towards the liquid crystal layer and that faces the pixel electrode is formed in the first substrate in at least sides of regions between the plurality of pixel electrodes that are parallel to a lengthwise direction of the plurality of parallel slits, wherein the common electrode covers at least a step face of the step, and wherein the liquid crystal display device is a fringe field switching mode device.

The other component parts of the liquid crystal display device of the present invention are not particularly limited, and any components typically used in liquid crystal display devices may be used as appropriate for those other component parts.

Effects of the Invention

The present invention provides an FFS mode liquid crystal display device that makes it possible to improve transmittance when a voltage is applied.

DETAILED DESCRIPTION OF EMBODIMENTS

Embodiments (and working examples) of the present invention will be explained in detail below with reference to figures. However, the present invention is not limited only to these embodiments (and working examples). Moreover, aspects of the configuration of each embodiment (and each working example) may be combined or modified as appropriate within the spirit of the present invention.

<Embodiment 1>

Embodiment 1 is an FFS mode liquid crystal display device in which the direction in which source bus lines run is parallel to the lengthwise direction of a plurality of parallel slits formed in a common electrode. Steps made from insulating films are formed on a liquid crystal layer-side layer of the source bus lines, and the common electrode is formed covering those steps.

Figure 1:
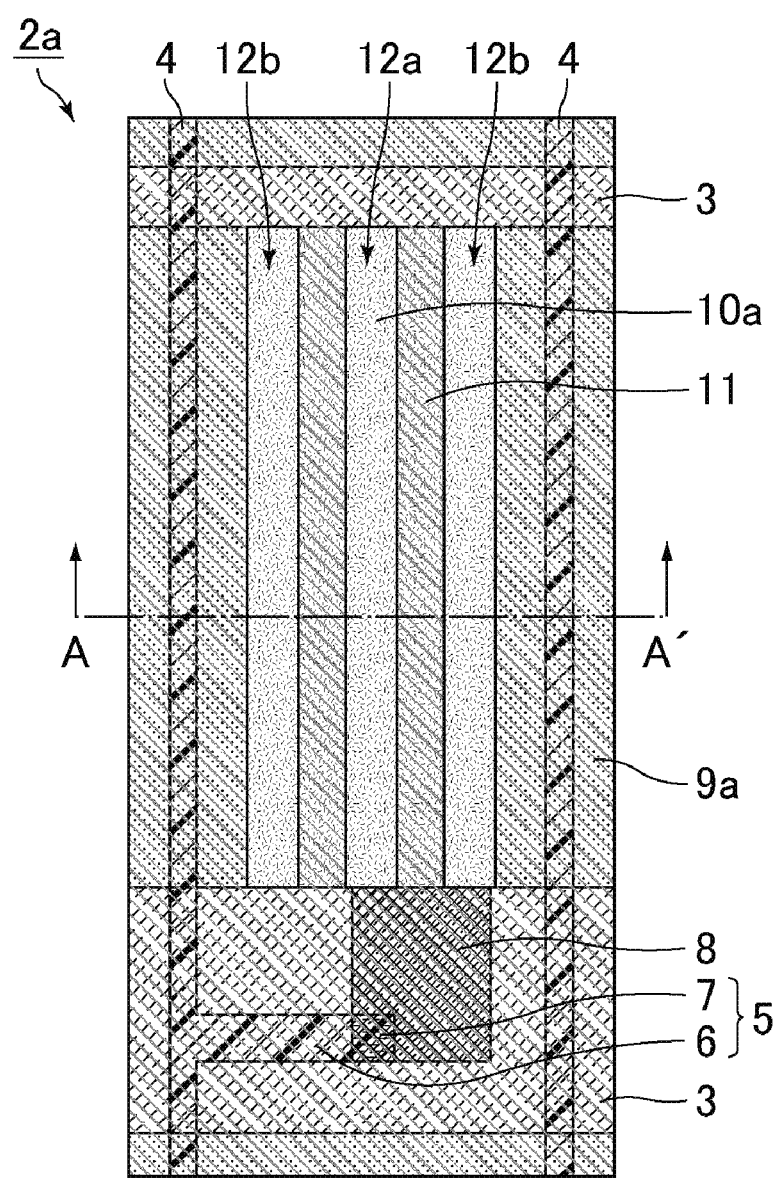
FIG. 1 is a plan view schematically illustrating a pixel of a liquid crystal display device according to Embodiment 1.

FIG. 1 is a plan view schematically illustrating a pixel of a liquid crystal display device according to Embodiment 1. As illustrated in FIG. 1, this pixel 2a includes gate bus lines 3; source bus lines 4 that run in a direction that intersects with the gate bus lines 3; a thin-film transistor element 5 that is electrically connected to one of the gate bus lines 3 and one of the source bus lines 4; an insulating film 9a that covers the gate bus lines 3, the source bus lines 4, and the thin-film transistor element 5; a plate-shaped pixel electrode 10a that is formed on top of the insulating film 9a and is electrically connected to the thin-film transistor element 5 via a contact hole 8; and a common electrode 11 that is layered on top of the pixel electrode 10a and has parallel slits 12a and 12b formed therein. The thin-film transistor element 5 includes a source electrode 6 that is electrically connected to one of the source bus lines 4 and a semiconductor layer 7. The direction in which the source bus lines 4 run is parallel to the lengthwise direction of the parallel slits 12a and 12b formed in the common electrode 11 (the vertical direction in FIG. 1).

In the pixel 2a, a voltage supplied from one of the source bus lines 4 is applied to the pixel electrode 10a via the source electrode 6, the semiconductor layer 7, and the contact hole 8 at a timing selected by the gate bus line 3. The pixel 2a and the pixel electrode 10a are rectangle-shaped but may also be formed to have any other shape as long as the effects of the present invention are still achieved.

The configuration of the semiconductor layer 7 is not particularly limited; however, it is preferable that the semiconductor layer 7 contain an oxide semiconductor material. Oxide semiconductor materials exhibit higher electron mobility than amorphous silicon and also tend to exhibit smaller variations in performance. Therefore, thin-film transistor elements that contain an oxide semiconductor can be driven at a higher speed than thin-film transistor elements that contain amorphous silicon. Moreover, due to the higher driving frequency and the ability to reduce the area occupied by each pixel, these types of thin-film transistor elements are more suitable to driving next-generation display devices that have higher resolutions. Furthermore, oxide semiconductor films can be formed using an easier process than the process for polycrystalline silicon films. This can be advantageous for devices that require large-area films. Therefore, when the thin-film transistor elements of the liquid crystal display device of the present invention include semiconductor layers that contain an oxide semiconductor material, higher driving speeds can be achieved.

Examples of oxide semiconductor materials that may be used include compounds made from indium, gallium, zinc, and oxygen; compounds made from indium, tin, zinc, and oxygen; compounds made from indium, aluminum, zinc, and oxygen; and the like.

Note that FIG. 1 only illustrates the configuration of a lower substrate 13a (a first substrate—described in more detail later). However, in reality an upper substrate 14 (a second substrate) is arranged facing the lower substrate 13a. Moreover, an insulating film 9b (described later) is also formed covering the pixel electrode 10a and the insulating film 9a. However, this insulating film 9b is transparent and is therefore not depicted in FIG. 1.

Figure 2:
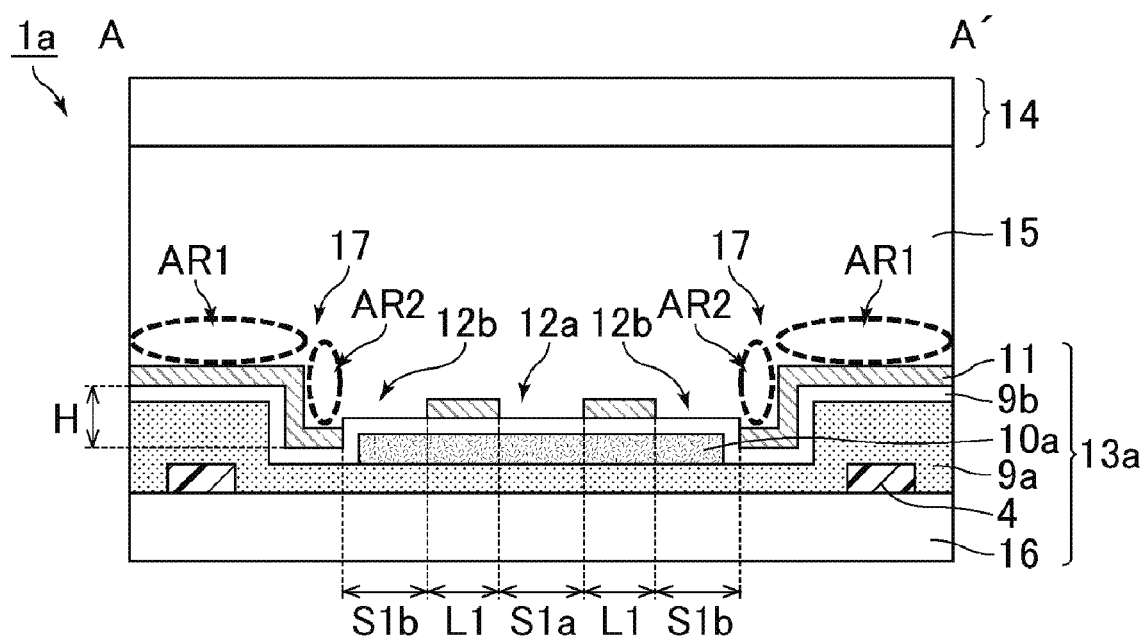
FIG. 2 is a cross-sectional view schematically illustrating a cross section taken along line A-A' in FIG. 1.

FIG. 2 is a cross-sectional view schematically illustrating a cross section taken along line A-A' in FIG. 1. As illustrated in FIG. 2, a liquid crystal display device 1a includes a lower substrate 13a, an upper substrate 14 arranged facing the lower substrate 13a, and a liquid crystal layer 15 that is sandwiched between the lower substrate 13a and the upper substrate 14.

The lower substrate 13a includes a supporting substrate 16, the source bus lines 4 that are formed on the liquid crystal layer 15-side surface of the supporting substrate 16, the insulating film 9a that covers the source bus lines 4, the pixel electrode 10a that is arranged on the liquid crystal layer 15-side surface of the insulating film 9a, the insulating film 9b that covers the pixel electrode 10a and the insulating film 9a, and the common electrode 11 that is arranged on the liquid crystal layer 15-side surface of the insulating film 9b. The parallel slits 12a and 12b are formed in the common electrode 11. Steps 17 that are made from the insulating films 9a and 9b are arranged on the liquid crystal layer 15-side layers of the source bus lines 4, and these steps 17 are covered by the common electrode 11. These steps 17 may also be arranged on the liquid crystal layer 15-side layer of the gate bus lines as well. Except for the insulating film 9a and the common electrode 11, the lower substrate 13a may be formed the same as in a conventional FFS mode liquid crystal display device. Note that FIG. 2 only illustrates a single pixel. In reality, however, a plurality of such pixels are arranged in the horizontal direction.

A transparent substrate such as a plastic substrate can be used for the supporting substrate 16, for example. Using a flexible plastic substrate as the transparent substrate makes it possible to provide a flexible liquid crystal display device.

Transparent electrodes made from indium tin oxide (ITO) or indium zinc oxide (IZO), for example, can be used for the pixel electrode 10a and the common electrode 11.

The insulating film 9a may be either an organic insulating film or an inorganic insulating film, for example. Examples of inorganic insulating films include silicon oxide (SiOx) and silicon nitride (SiNx) films, for example. Examples of organic insulating films include films made from a transparent organic polymer such as an acrylic resin or polyimide, for example. Alternatively, a color filter may be used in place of such an organic insulating film. After forming the insulating film 9a over the entire pixel such that the source bus lines 4 are covered, a portion of the insulating film 9a is half-etched to form the steps 17.

The insulating film 9b may be either an organic insulating film or an inorganic insulating film, for example. Examples of inorganic insulating films include SiNx films or the like. Examples of organic insulating films include films made from a transparent organic polymer such as an acrylic resin or polyimide, for example. The insulating film 9b is formed as a film covering the insulating film 9a and the pixel electrode 10a after the pixel electrode 10a is formed on the liquid crystal layer 15-side surface of the insulating film 9a.

The steps 17 are made from the insulating films 9a and 9b but are not particularly limited to this configuration. For example, the steps 17 may be made from a single-layer insulating film or may be made from an insulating film with three or more layers. Moreover, conductors such as wires may be arranged between the insulating films. Furthermore, semiconductor materials with an electrical resistance of less than or equal to $10^{-12} \Omega \cdot cm$ when no voltage is applied (such as titanium oxide (TiOx) or oxide semiconductor materials made from indium, gallium, zinc, and oxygen) may be used for the insulating films. When the steps are formed using insulating films, it is preferable that organic insulating films be used because organic insulating films can easily be formed thickly.

The upper substrate 14 may include a color filter, a black matrix, and the like that are arranged as appropriate on the surface of a supporting substrate. When a color filter is arranged on the lower substrate 13a, a color filter is not arranged on the upper substrate 14.

Alignment films (not illustrated in the figure) are formed on the liquid crystal layer 15-side surfaces of the lower substrate 13a and the upper substrate 14. These alignment films make the liquid crystal molecules in the liquid crystal layer 15 align horizontally relative to the liquid crystal layer 15-side surfaces of the lower substrate 13a and the upper substrate 14 when no voltage is applied.

The liquid crystal layer 15 can be formed using the same manufacturing method as in a conventional FFS mode liquid crystal display device. The liquid crystal molecules contained in the liquid crystal layer 15 may exhibit either positive dielectric anisotropy ($\Delta \in > 0$) or negative dielectric anisotropy ($\Delta \in < 0$). However, the parameters of the liquid crystal molecules such as the dielectric anisotropy $\Delta \in$ and the refractive index anisotropy $\Delta n$ are not particularly limited.

The liquid crystal display device 1a may also include a pair of linear polarizing plates (not illustrated in the figure) arranged on the sides of the lower substrate 13a and the upper substrate 14 opposite to the liquid crystal layer 15 side. Alternatively, a pair of circular polarizing plates may be used instead of a pair of linear polarizing plate.

Next, working examples created by actually producing the liquid crystal display device according to Embodiment 1 will be described.

(Working Example 1)

In Working Example 1, the height H of the steps 17 was set to 100 nm. An oxide semiconductor material made from indium, gallium, zinc, and oxygen was used for the semiconductor layer 7. ITO was used as the material for the pixel electrode 10a and the common electrode 11. The electrode width L1 of the common electrode 11 layered on top of the pixel electrode 10a was set to 2.4 μm, the width S1a of the parallel slit 12a was set to 3.6 μm, and the width S1b of the parallel slits 12b was set to 4.1 μm. SiOx was used as the material for the insulating film 9a. SiNx was used as the material for the insulating film 9b, and the thickness of the insulating film 9b was set to 100 nm. The thickness of the liquid crystal layer was set to 3.4 μm. Liquid crystal molecules with positive dielectric anisotropy were used in the liquid crystal layer 15. The dielectric anisotropy $\Delta\in$ of the liquid crystal molecules was 8.0, and the refractive index anisotropy Δn of the liquid crystal molecules was 0.1030. A 7 inch wide ultra extended graphics array (WUXGA) panel with a pixel pitch (interval between adjacent pixels) of 26.25 μm and a resolution of 322 pixels per inch (ppi) was used as the liquid crystal display panel for the liquid crystal display device. Furthermore, the amount by which the black matrix arranged on the upper substrate 14 was shifted relative to the source bus lines 4 in the direction in which the gate bus lines 3 run (the left and right direction in FIG. 1; hereinafter, this amount will be referred to simply as the "shift amount") was set to 0 μm. The width of the black matrix lines was set to 5 μm.

(Working Example 2)

In Working Example 2, the height H of the steps 17 was set to 150 nm. Except for the height of the steps 17, Working Example 2 is the same as Working Example 1, and therefore a description of the identical aspects will be omitted here.

(Working Example 3)

In Working Example 3, the height H of the steps 17 was set to 200 nm. Except for the height of the steps 17, Working Example 3 is the same as Working Example 1, and therefore a description of the identical aspects will be omitted here.

(Working Example 4)

In Working Example 4, the height H of the steps 17 was set to 300 nm. Except for the height of the steps 17, Working Example 4 is the same as Working Example 1, and therefore a description of the identical aspects will be omitted here.

(Working Example 5)

In Working Example 5, the height H of the steps 17 was set to 350 nm. Except for the height of the steps 17, Working Example 5 is the same as Working Example 1, and therefore a description of the identical aspects will be omitted here.

(Working Example 6)

In Working Example 6, the height H of the steps 17 was set to 400 nm. Except for the height of the steps 17, Working Example 6 is the same as Working Example 1, and therefore a description of the identical aspects will be omitted here.

(Working Example 7)

In Working Example 7, the height H of the steps 17 was set to 500 nm. Except for the height of the steps 17, Working Example 7 is the same as Working Example 1, and therefore a description of the identical aspects will be omitted here.

(Working Example 8)

In Working Example 8, the height H of the steps 17 was set to 600 nm. Except for the height of the steps 17, Working Example 8 is the same as Working Example 1, and therefore a description of the identical aspects will be omitted here.

(Working Example 9)

In Working Example 9, the height H of the steps 17 was set to 800 nm. Except for the height of the steps 17, Working Example 9 is the same as Working Example 1, and therefore a description of the identical aspects will be omitted here.

(Working Example 10)

In Working Example 10, the height H of the steps 17 was set to 1000 nm. Except for the height of the steps 17, Working Example 10 is the same as Working Example 1, and therefore a description of the identical aspects will be omitted here.

<Comparative Embodiment 1>

Comparative Embodiment 1 is configured the same as the conventional FFS mode liquid crystal display device described above in reference to FIG. 10 and corresponds to a case in which the height H of the steps 17 illustrated in FIG. 2 are set to 0 nm.

Next, a comparison example created by actually producing the liquid crystal display device according to Comparative Embodiment 1 will be described.

(Comparison Example 1)

Figure 10:
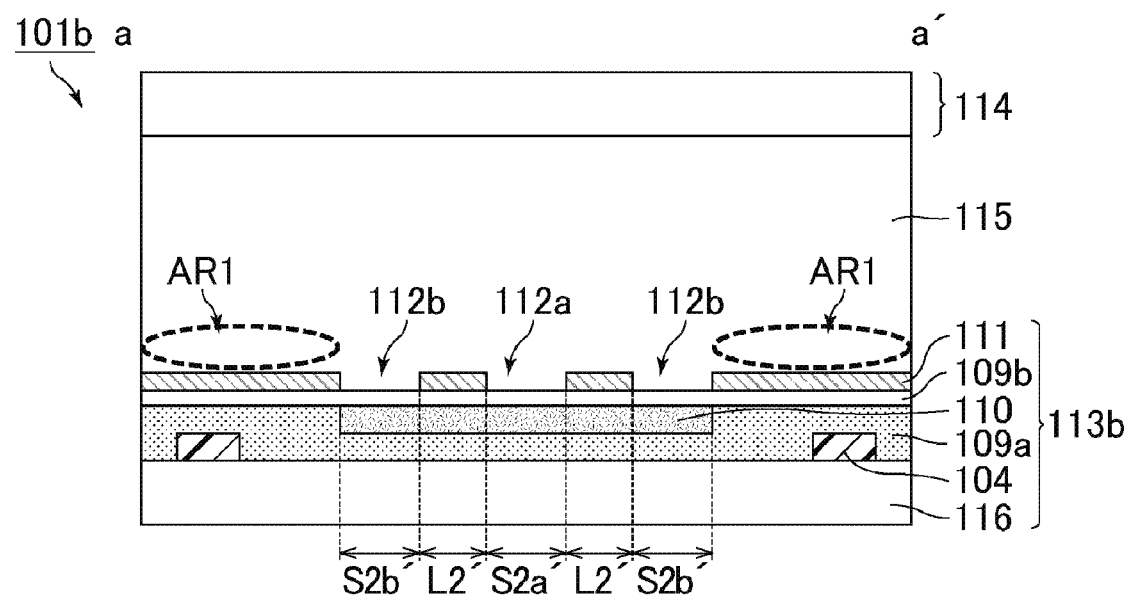
FIG. 10 is a cross-sectional view schematically illustrating a cross section taken along line a-a' in FIG. 9.

In Comparison Example 1, the electrode width L2' of the common electrode 111 layered on top of the pixel electrode 110 as illustrated in FIG. 10 was set to 2.4 μm, the width S2a' of the parallel slit 112a was set to 3.6 μm, and the width S2b' of the parallel slits 112b was set to 4.1 μm. Except for these conditions, Comparison Example 1 is the same as Working Example 1, and therefore a description of the identical aspects will be omitted here.

(Comparison Example 2)

In Comparison Example 2, the electrode width L2' of the common electrode 111 layered on top of the pixel electrode 110 as illustrated in FIG. 10 was set to 2.2 μm, the width S2a' of the parallel slit 112a was set to 3.6 μm, and the width S2b' of the parallel slits 112b was set to 3.6 μm. An 8.4 inch wide quad extended graphics array (WQXGA) panel with a pixel pitch of 23.5 μm and a resolution of 359 ppi was used as the liquid crystal display panel for the liquid crystal display device. Except for these conditions, Comparison Example 2 is the same as Comparison Example 1, and therefore a description of the identical aspects will be omitted here.

<Comparative Embodiment 2>

Comparative Embodiment 2 has a similar configuration as the liquid crystal display device according to Embodiment 1 as described above in reference to FIG. 2. Here, however, the common electrode does not cover the steps. Except for the fact that the common electrode does not cover the steps, Comparative Embodiment 2 is the same as Embodiment 1, and therefore a description of the identical aspects will be omitted here.

Figure 3:
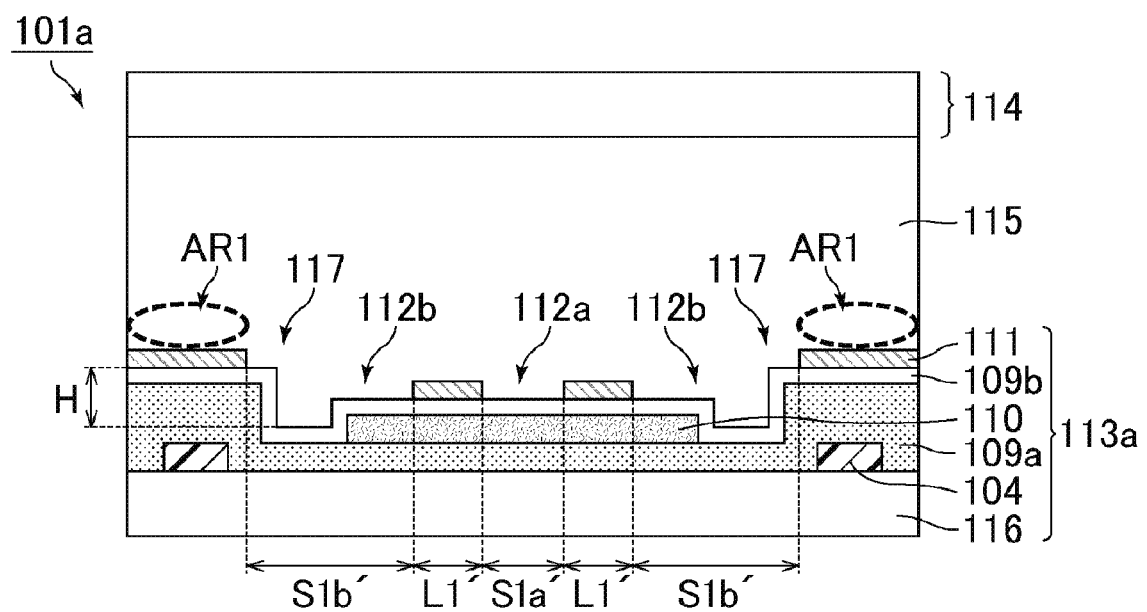
FIG. 3 is a cross-sectional view schematically illustrating a cross section of a pixel of a liquid crystal display device according to Comparative Embodiment 2.

FIG. 3 is a cross-sectional view schematically illustrating a cross section of a pixel of a liquid crystal display device according to Comparative Embodiment 2. As illustrated in FIG. 3, a liquid crystal display device 101a includes a lower substrate 113a, an upper substrate 114 arranged facing the lower substrate 113a, and a liquid crystal layer 115 that is sandwiched between the lower substrate 113a and the upper substrate 114. The lower substrate 113a includes a supporting substrate 116, source bus lines 104 that are formed on the liquid crystal layer 115-side surface of the supporting substrate 116, an insulating film 109a that covers the source bus lines 104, a pixel electrode 110 that is arranged on the liquid crystal layer 115-side surface of the insulating film 109a, an insulating film 109b that covers the pixel electrode 110 and the insulating film 109a, and a common electrode 111 that is arranged on the liquid crystal layer 115-side surface of the insulating film 109b. Parallel slits 112a and 112b are formed in the common electrode 111. Steps 117 that are made from the insulating films 109a and 109b are arranged on the liquid crystal layer 115-side layers of the source bus lines 104, and these steps 117 are not covered by the common electrode 111. Note that FIG. 3 only illustrates a single pixel. In reality, however, a plurality of such pixels are arranged in the horizontal direction.

Next, a comparison example created by actually producing the liquid crystal display device according to Comparative Embodiment 2 will be described.

(Comparison Example 3)

In Comparison Example 3, the height H of the steps 117 was set to 400 nm. The electrode width L1' of the common electrode 111 layered on top of the pixel electrode 110 was set to 2.4 μm, the width S1a' of the parallel slit 112a was set to 3.6 μm, and the width S1b' of the parallel slits 112b was set to 4.5 μm. Except for these conditions, Comparison Example 3 is the same as Working Example 1, and therefore a description of the identical aspects will be omitted here.

<Results of Evaluating Different Step Heights H>

Figure 4:
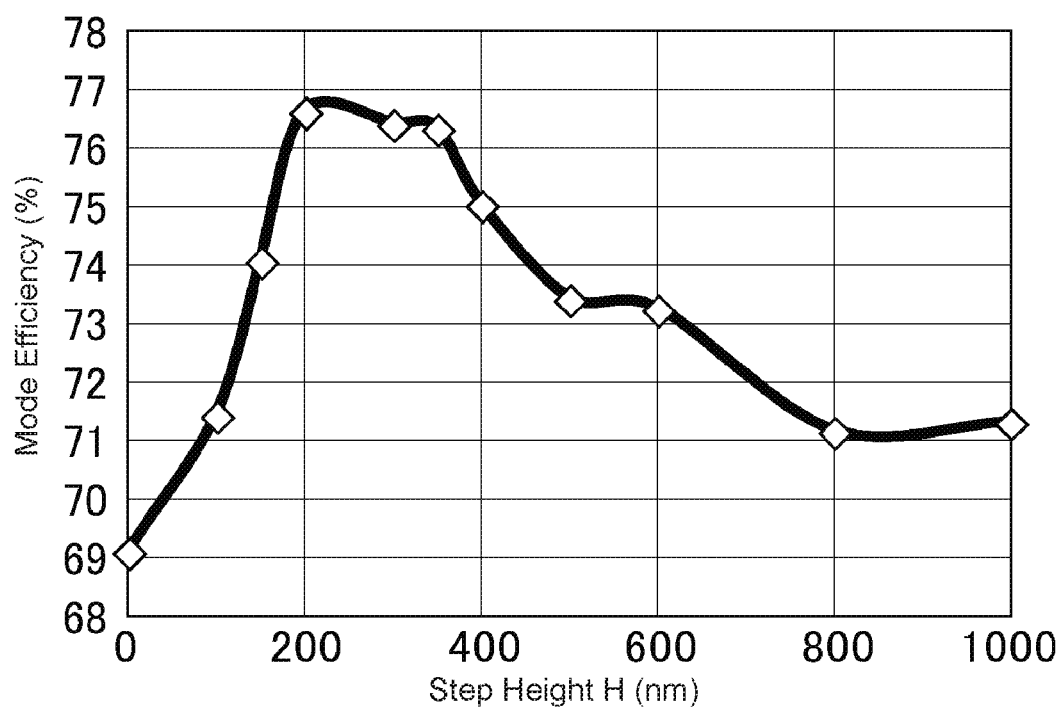
FIG. 4 is a graph showing the mode efficiencies of liquid crystal display devices according to Working Examples 1 to 10 and Comparison Example 1.

Table 1 summarizes the height H of the steps 17 and the resulting mode efficiency in the liquid crystal display devices of Working Examples 1 to 10 and Comparison Example 1. FIG. 4 is a graph of the data shown in Table 1. In other words, FIG. 4 is a graph showing the mode efficiencies of liquid crystal display devices according to Working Examples 1 to 10 and Comparison Example 1. In FIG. 4, the horizontal axis is the height H of the steps 17, and the vertical axis is the resulting mode efficiency.

In a liquid crystal display device that includes a pair of linear polarizing plates arranged on either side thereof, the "mode efficiency" is defined as the ratio of the transmittance when a white voltage (the voltage that results in the white display state) is applied and the pair of linear polarizing plates are arranged in a crossed Nicols state to the transmittance when no voltage is applied and the pair of linear polarizing plates are arranged in a parallel Nicols state. Here, the white voltage was set to 4.0V. A DaouXilicon Co. Expert LCD liquid crystal panel design optical simulator was used to perform the transmittance simulations.

TABLE 1

| | Height H of Steps (nm) | Mode Efficiency (%) |
|---|---|---|
| Comparison Example 1 | 0 | 69.09 |
| Working Example 1 | 100 | 71.42 |
| Working Example 2 | 150 | 74.05 |
| Working Example 3 | 200 | 76.61 |
| Working Example 4 | 300 | 76.40 |
| Working Example 5 | 350 | 76.32 |
| Working Example 6 | 400 | 75.02 |
| Working Example 7 | 500 | 73.41 |
| Working Example 8 | 600 | 73.23 |
| Working Example 9 | 800 | 71.14 |
| Working Example 10 | 1000 | 71.30 |

As shown in FIG. 4, Working Examples 1 to 10 exhibited a higher mode efficiency than Comparison Example 1. This indicates that the mode efficiency increases when the steps 17 are present (that is, when the steps 17 have a non-zero height H). Moreover, from the perspective of achieving a greater increase in the mode efficiency, it is preferable that the height H of the steps 17 be greater than or equal to 100 nm, more preferable that the height H of the steps 17 be greater than or equal to 150 nm and less than or equal to 600 nm, and even more preferable that the height H of the steps 17 be greater than or equal to 200 nm and less than or equal to 400 nm. The increase in mode efficiency is particularly pronounced when the height H of the steps 17 is greater than or equal to 200 nm and less than or equal to 400 nm. Next, the reason why the mode efficiency increases when the steps 17 are present will be described with reference to FIGS. 5 and 6.

Figure 5:
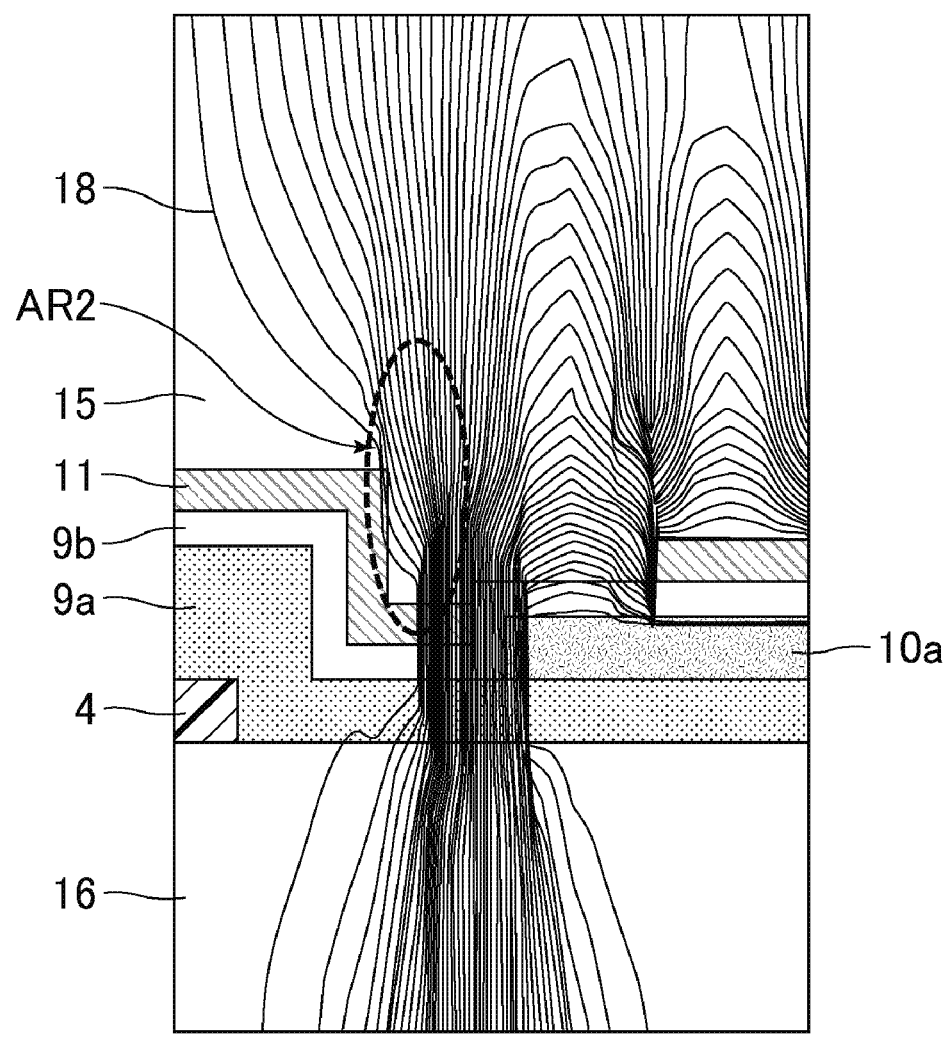
FIG. 5 illustrates the distribution of lines of electric force in the white display state of a liquid crystal display device according to Working Example 4.
Figure 6:
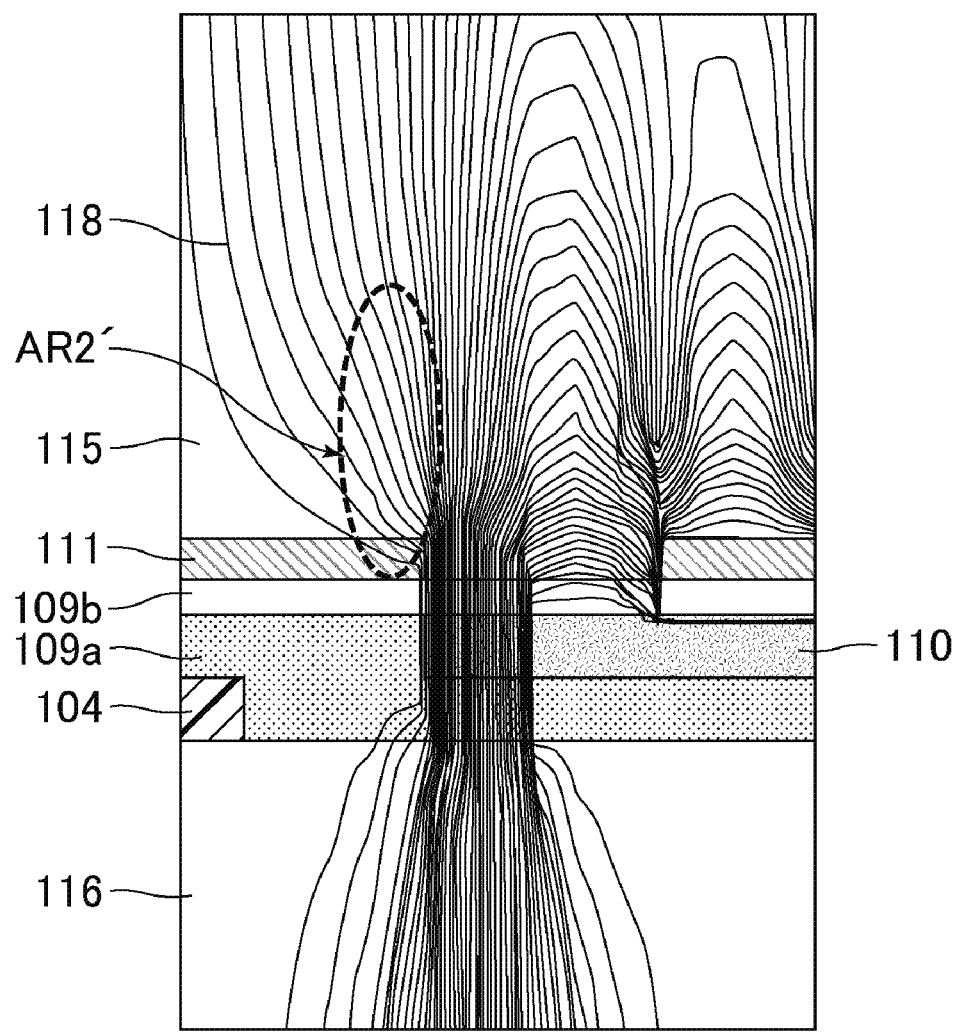
FIG. 6 illustrates the distribution of lines of electric force in the white display state of a liquid crystal display device according to Comparison Example 1.

FIG. 5 illustrates the distribution of lines of electric force in the white display state of a liquid crystal display device according to Working Example 4. FIG. 6 illustrates the distribution of lines of electric force in the white display state of a liquid crystal display device according to Comparison Example 1. FIGS. 5 and 6 are enlarged views of portions of the configurations illustrated in FIGS. 2 and 10, respectively, showing the results of simulations performed using the DaouXilicon Co. Expert LCD liquid crystal panel design optical simulator. Comparing FIGS. 5 and 6 reveals that the lines of electric force 18 in the region AR2 in FIG. 5 extend in a more vertical direction and are more densely concentrated than the lines of electric force 118 in the corresponding region AR2' in FIG. 6. This is because, as illustrated in FIG. 5, the steps 17 cause the horizontal electric field (horizontal relative to the liquid crystal layer 15-side surface of the lower substrate 13a) to become more concentrated at the side faces (step faces) of the steps (the region AR2) when a voltage is applied. As a result, the horizontal electric field extends all the way to the edge regions AR1 (the regions arranged between the pixel electrodes of adjacent pixels) of the pixel illustrated in FIG. 2. This causes the orientation of the liquid crystal molecules to change sufficiently, thereby improving the mode efficiency. Moreover, as shown in FIG. 4, when the height H of the steps 17 is greater than 400 nm, the mode efficiency is less than when the height H of the steps 17 is 200 to 400 nm (although the mode efficiency is still higher than in Comparison Example 1). This is likely because when the height H of the steps 17 is too large, it becomes more difficult for the horizontal electric field that is concentrated at the side faces (the regions AR2) of the steps to extend all the way to the edge regions AR1 of the pixel. Furthermore, as shown in FIG. 4, when the height H of the steps 17 is less than 200 nm, the mode efficiency is less than when the height H of the steps 17 is 200 to 400 nm (although the mode efficiency is still higher than in Comparison Example 1). This is likely because when the height H of the steps 17 is too small, the horizontal electric field that is concentrated at the side faces (the regions AR2) of the steps becomes relatively weak.

<Results of Evaluating Different Common Electrode and Step Arrangement Patterns>

Table 2 summarizes the arrangement patterns used for the common electrode 11 (111) and the steps 17 (117) (hereinafter, simply "arrangement patterns") as well as the resulting mode efficiency in the liquid crystal display devices according to Working Example 6 and Comparison Example 3. Mode efficiency was measured using the same method as in Working Examples 1 to 10. Moreover, in Table 2, the "Covered" arrangement pattern refers to the configuration illustrated in FIG. 2 in which the common electrode 11 covers the steps 17, and the "Not covered" arrangement pattern refers to the configuration illustrated in FIG. 3 in which the common electrode 111 does not cover the steps 117.

TABLE 2

| | Arrangement Pattern | Mode Efficiency (%) |
|---|---|---|
| Working Example 6 | Covered | 75.02 |
| Comparison Example 3 | Not covered | 71.50 |

As shown in Table 2, Working Example 6 exhibited an improvement of approximately 4.9% in mode efficiency in comparison with Comparison Example 3. This indicates that when the common electrode 11 covers the steps 17 as illustrated in FIG. 2, the mode efficiency increases. When the common electrode 11 covers the steps 17, the distance between the pixel electrode 10a and the common electrode 11 is smaller and the common electrode 11 is also formed on the side faces of the steps 17, thereby causing the horizontal electric field to become concentrated at those regions (the regions AR2). As a result, the horizontal electric field extends all the way to the edge regions AR1 and causes the orientation of the liquid crystal molecules to change sufficiently, thereby improving the mode efficiency. Meanwhile, as illustrated in FIG. 3, when the common electrode 111 does not cover the steps 117, no horizontal electric field is formed at the side faces of the steps 117. Therefore, the horizontal electric field does not extend with sufficient magnitude all the way to the edge regions AR1 of the pixel. The evaluation described above was performed using a configuration in which the height H of the steps 17 was 400 nm. However, the same results would be obtained for a configuration in which the height H of the steps 17 was 200 nm, for example.

As described above, configurations in which the steps 17 are present and the common electrode 11 covers the steps 17 as in Embodiment 1 make it possible to improve the transmittance when a voltage is applied. Also, for convenience, the results of the evaluation of Comparison Example 2 will be described later.

<Embodiment 2>

Embodiment 2 is an FFS mode liquid crystal display device in which the direction in which source bus lines run is parallel to the lengthwise direction of a plurality of parallel slits formed in a common electrode. Steps made from insulating films are formed on a liquid crystal layer-side layer of the source bus lines, and the common electrode is formed covering those steps. Furthermore, the semiconductor layers of thin-film transistor elements contain an oxide semiconductor material. Pixel electrodes are arranged in the same layer as the semiconductor layers and are made from a material obtained by turning the oxide semiconductor material into a conductor. Embodiment 2 is the same as Embodiment 1 except for the configuration of the pixel electrodes and semiconductor layers, and therefore a description of the identical aspects will be omitted here.

Figure 7:
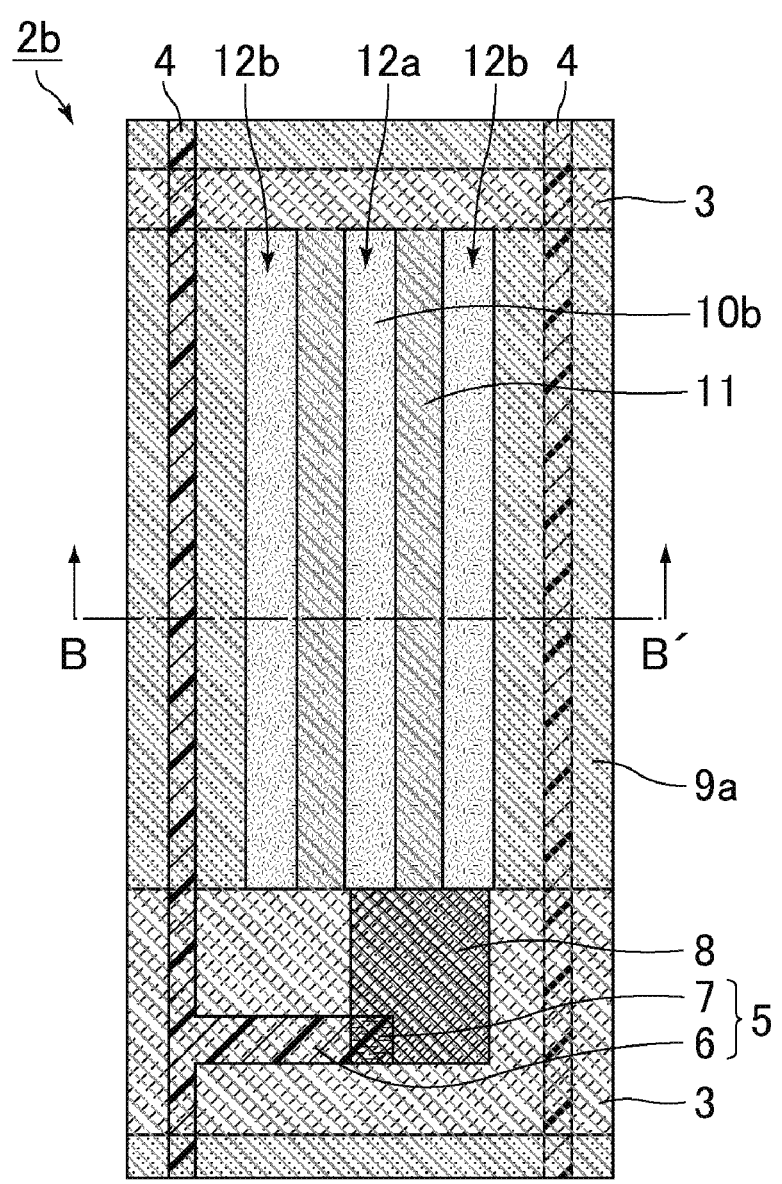
FIG. 7 is a plan view schematically illustrating a pixel of a liquid crystal display device according to Embodiment 2.

FIG. 7 is a plan view schematically illustrating a pixel of a liquid crystal display device according to Embodiment 2. As illustrated in FIG. 7, this pixel 2b includes gate bus lines 3; source bus lines 4 that run in a direction that intersects with the gate bus lines 3; a thin-film transistor element 5 that is electrically connected to one of the gate bus lines 3 and one of the source bus lines 4; an insulating film 9a that covers the gate bus lines 3, the source bus lines 4, and the thin-film transistor element 5; a plate-shaped pixel electrode 10b that is formed on top of the insulating film 9a and is electrically connected to the thin-film transistor element 5 via a contact hole 8; and a common electrode 11 that is layered on top of the pixel electrode 10b and has parallel slits 12a and 12b formed therein. The thin-film transistor element 5 includes a source electrode 6 that is electrically connected to one of the source bus lines 4 and a semiconductor layer 7 that contains an oxide semiconductor material. The direction in which the source bus lines 4 run is parallel to the lengthwise direction of the parallel slits 12a and 12b formed in the common electrode 11 (the vertical direction in FIG. 7).

Figure 8:
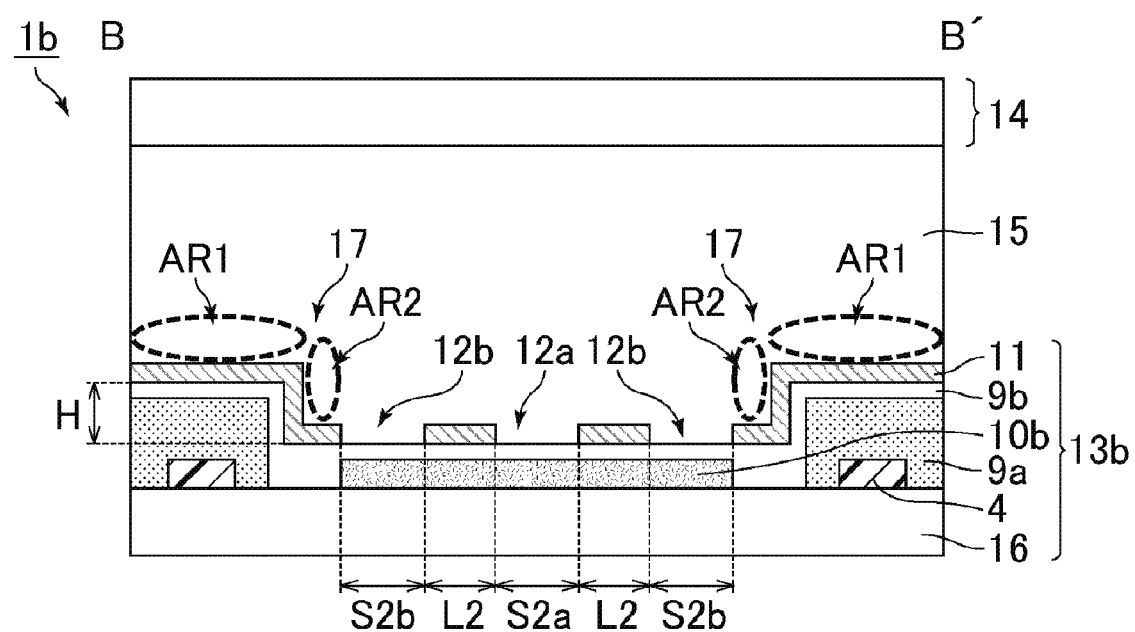
FIG. 8 is a cross-sectional view schematically illustrating a cross section taken along line B-B' in FIG. 7.
Figure 9:
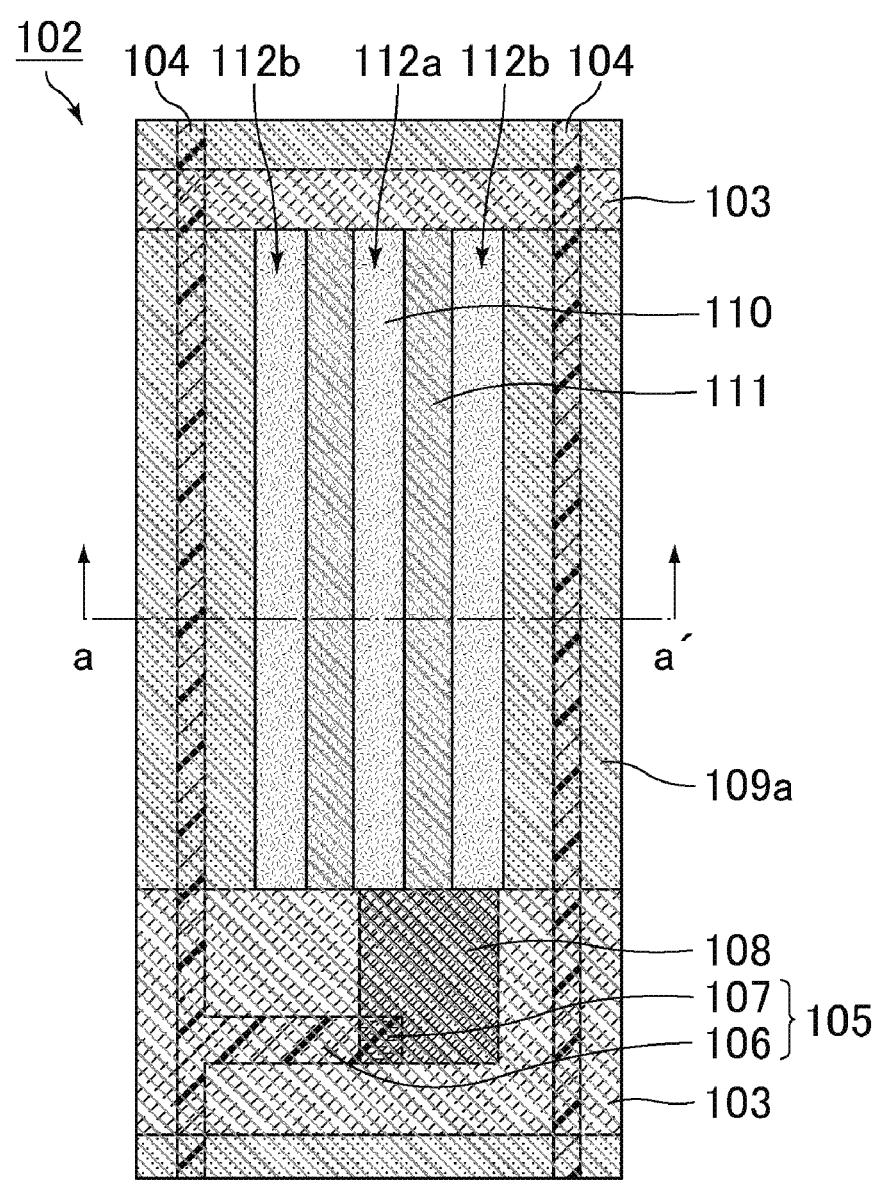
FIG. 9 is a plan view schematically illustrating a pixel in a conventional FFS mode liquid crystal display device.

FIG. 8 is a cross-sectional view schematically illustrating a cross section taken along line B-B' in FIG. 7. As illustrated in FIG. 8, a liquid crystal display device 1b includes a lower substrate 13b (a first substrate), an upper substrate 14 (a second substrate) arranged facing the lower substrate 13b, and a liquid crystal layer 15 that is sandwiched between the lower substrate 13b and the upper substrate 14.

The lower substrate 13b includes a supporting substrate 16, the source bus lines 4 and the pixel electrode 10b that are formed on the liquid crystal layer 15-side surface of the supporting substrate 16, the insulating film 9a that covers the source bus lines 4, the insulating film 9b that covers the pixel electrode 10b and the insulating film 9a, and the common electrode 11 that is arranged on the liquid crystal layer 15-side surface of the insulating film 9b. The parallel slits 12a and 12b are formed in the common electrode 11. Steps 17 that are made from the insulating films 9a and 9b are arranged on the liquid crystal layer 15-side layers of the source bus lines 4, and these steps 17 are covered by the common electrode 11. These steps 17 may also be arranged on the liquid crystal layer 15-side layer of the gate bus lines as well. Except for the insulating film 9a, the pixel electrode 10b, and the common electrode 11, the lower substrate 13b may be formed the same as in a conventional FFS mode liquid crystal display device. Note that FIG. 8 only illustrates a single pixel. In reality, however, a plurality of such pixels are arranged in the horizontal direction.

After forming the insulating film 9a over the entire pixel such that the source bus lines 4 are covered, a portion of the insulating film 9a is etched to form the steps 17.

The pixel electrode 10b is a transparent electrode formed by patterning a film that is formed at the same time as the semiconductor layer 7 illustrated in FIG. 7, and the oxide semiconductor material contained in the pattern corresponding to the pixel electrode 10b is turned into a conductor. More specifically, when the oxide semiconductor material is a compound made from indium, gallium, zinc, and oxygen, for example, a reduction reaction is induced using hydrogen gas to turn the indium contained in the oxide semiconductor material into a conductor. Other examples of oxide semiconductor materials that may be used include compounds made from indium, tin, zinc, and oxygen; compounds made from indium, aluminum, zinc, and oxygen; and the like.

Next, working examples created by actually producing the liquid crystal display device according to Embodiment 2 will be described.

(Working Example 11)

In Working Example 11, the height H of the steps 17 was set to 300 nm. The electrode width L2 of the common electrode 11 layered on top of the pixel electrode 10b was set to 2.4 µm, the width S2a of the parallel slit 12a was set to 3.6 µm, and the width S2b of the parallel slits 12b was set to 4.1 µm. Except for these conditions, Working Example 11 is the same as Working Example 1, and therefore a description of the identical aspects will be omitted here.

(Working Example 12)

In Working Example 12, the height H of the steps 17 was set to 300 nm. The electrode width L2 of the common electrode 11 layered on top of the pixel electrode 10b was set to 2.2 µm, the width S2a of the parallel slit 12a was set to 3.6 µm, and the width S2b of the parallel slits 12b was set to 3.6 µm. An 8.4 inch WQXGA panel with a pixel pitch of 23.5 µm and a resolution of 359 ppi was used as the liquid crystal display panel for the liquid crystal display device. Except for these conditions, Working Example 12 is the same as Working Example 11, and therefore a description of the identical aspects will be omitted here.

<Evaluation Results>

Tables 3 and 4 summarize the height H of the steps 17 and the resulting mode efficiency in the liquid crystal display devices of each resolution in Working Examples 4, 11, and 12 and Comparison Examples 1 and 2. Mode efficiency was measured using the same method as in Working Examples 1 to 10.

TABLE 3

|  | Resolution (ppi) | Height H of Steps (nm) | Mode Efficiency (%) |
|---|---|---|---|
| Working Example 4 | 322 | 300 | 76.40 |
| Working Example 11 |  | 300 | 76.30 |
| Comparison Example 1 |  | 0 | 70.50 |

TABLE 4

|  | Resolution (ppi) | Height H of Steps (nm) | Mode Efficiency (%) |
|---|---|---|---|
| Working Example 12 | 359 | 300 | 74.70 |
| Comparison Example 2 |  | 0 | 68.60 |

As shown in Table 3 for the liquid crystal display devices with a resolution of 322 ppi, Working Example 4 exhibited an improvement of approximately 8.4% in mode efficiency in comparison with Comparison Example 1. Moreover, Working Example 11 exhibited an improvement of approximately 8.2% in mode efficiency in comparison with Comparison Example 1.

As shown in Table 4 for the liquid crystal display devices with a resolution of 359 ppi, Working Example 12 exhibited an improvement of approximately 8.9% in mode efficiency in comparison with Comparison Example 2.

As described above, the liquid crystal display devices according to Embodiments 1 and 2 make it possible to improve the transmittance when a voltage is applied. Moreover, comparing the evaluation results for different resolutions (Tables 3 and 4) reveals that the effects of the present invention become increasingly pronounced as higher resolutions are used. The evaluation described above was performed using configurations in which the height H of the steps 17 was 300 nm. However, the same results would be obtained for other heights H (as long as H>0). Furthermore, the liquid crystal display device according to Embodiment 2 also makes it possible to achieve the following additional effects.

Typically, a film formation process using a photomask is used when forming the layers of the lower substrate. However, as the number of photomasks increases (that is, as the number of film formation processes increases), manufacturing efficiency decreases. Table 5 summarizes whether a photomask is used when forming each layer of the lower substrate (in the order in which the layers are formed) in the liquid crystal display devices according to Embodiments 1 and 2 and Comparative Embodiments 1 and 2. In Table 5, "Y" indicates that a photomask is used, and "N" indicates that a photomask is not used.

TABLE 5

|  | Embodiment 1 Comparative Embodiment 1 Comparative Embodiment 2 | Embodiment 2 |
|---|---|---|
| Gate bus lines 3 (103) | Y | Y |
| Semiconductor layer 7 (107) | Y | Y |
| Source bus lines 4 (104) | Y | Y |
| Insulating film 9a (109a) | Y | Y |
| Pixel electrode 10a, 10b (110) | Y | N |
| Insulating film 9b (109b) | Y | Y |
| Common electrode 11 (111) | Y | Y |

As shown in Table 5, Embodiment 2 uses one photomask less than the other embodiments. This because the pixel electrode 10b of the liquid crystal display device according to Embodiment 2 is formed by patterning a film that is formed at the same time as the semiconductor layer 7, and the oxide semiconductor material contained in the pattern corresponding to the pixel electrode 10b is turned into a conductor. As a result, a separate photomask for forming just the pixel electrode 10b is not required. Therefore, the liquid crystal display device according to Embodiment 2 makes it possible to achieve excellent manufacturing efficiency.

In Embodiments 1 and 2 as described above, the direction in which the source bus lines run is parallel to the lengthwise direction of the plurality of parallel slits formed in the common electrode. However, a configuration in which the direction in which the gate bus lines run is parallel to the lengthwise direction of the plurality of parallel slits formed in the common electrode, steps made from insulating films are formed on a liquid crystal layer-side layer of the gate bus lines, and the common electrode is formed covering those steps, which makes it possible to achieve the effects of the present invention.

<Additional Notes>

Next, examples of preferred embodiments of the liquid crystal display device of the present invention will be described. Moreover, aspects of the configuration of each example may be combined as appropriate within the spirit of the present invention.

It is preferable that the height of the steps be greater than or equal to 100 nm, more preferable that the height of the steps be greater than or equal to 150 nm and less than or equal to 600 nm, and even more preferable that the height of the steps be greater than or equal to 200 nm and less than or equal to 400 nm. This makes it possible to improve the transmittance when a voltage is applied. Moreover, setting the height of the steps to a value greater than or equal to 200 nm and less than or equal to 400 nm makes it possible to achieve a particularly pronounced improvement in the transmittance when a voltage is applied.

The liquid crystal display device may be configured such that the first substrate further includes a plurality of source bus lines formed in the regions between the plurality of pixel electrodes, such that a direction in which the source bus lines run is parallel to the lengthwise direction of the plurality of parallel slits, and such that the steps are made from an insulating film that covers the plurality of source bus lines and the insulating film that covers the plurality of pixel electrodes. This makes it possible to sufficiently change the orientation of the liquid crystal molecules near the source bus lines when a voltage is applied, thereby making it possible to improve transmittance.

The liquid crystal display device may be configured such that the first substrate further includes a plurality of gate bus lines formed in the regions between the plurality of pixel electrodes, such that a direction in which the gate bus lines run is parallel to the lengthwise direction of the plurality of parallel slits, and such that the steps are made from an insulating film that covers the plurality of gate bus lines and the insulating film that covers the plurality of pixel electrodes. This makes it possible to sufficiently change the orientation of the liquid crystal molecules near the gate bus lines when a voltage is applied, thereby making it possible to improve transmittance.

The liquid crystal display device may be configured such that the first substrate further includes a plurality of thin-film transistor elements arranged in the regions between the plurality of pixel electrodes, such that each of the plurality of thin-film transistor elements includes a semiconductor layer that contains an oxide semiconductor material, and such that the plurality of pixel electrodes are arranged in the same layer as the semiconductor layers and are made from a material obtained by turning the oxide semiconductor material into a conductor. The oxide semiconductor material may be made from indium, gallium, zinc, and oxygen. This makes it possible to form the plurality of pixel electrodes and the semiconductor layers during the same film formation process, thereby making it possible to achieve excellent manufacturing efficiency. Moreover, configurations in which the semiconductor layers contain an oxide semiconductor material make it possible to drive the display device at higher speeds. Furthermore, configurations in which the plurality of pixel electrodes are arranged in the same layer as the semiconductor layers may include configurations in which the liquid crystal layer sides and/or the sides opposite to the liquid crystal layer of the plurality of pixel electrodes and the semiconductor layers are formed in contact with the same member (such as a supporting substrate), for example. Moreover, the plurality of pixel electrodes and the semiconductor layers may be arranged on top of the same supporting substrate at positions that are separated from one another, for example.

| Description of Reference Character | |
| --- | --- |
| 1a, 1b, 101a, 101b | liquid crystal display device |
| 2a, 2b, 102 | pixel |
| 3, 103 | gate bus line |
| 4, 104 | source bus line |
| 5, 105 | thin-film transistor element |
| 6, 106 | source electrode |
| 7, 107 | semiconductor layer |
| 8, 108 | contact hole |
| 9a, 9b, 109a, 109b | insulating film |
| 10a, 10b, 110 | pixel electrode |
| 11, 111 | common electrode |
| 12a, 12b, 112a, 112b | parallel slit |
| 13a, 13b, 113a, 113b | lower substrate |
| 14, 114 | upper substrate |
| 15, 115 | liquid crystal layer |
| 16, 116 | supporting substrate |
| 17, 117 | step |
| 18, 118 | line of electric force |
| AR1 | edge region of pixel |
| AR2 | side face of step |
| AR2' | region corresponding to AR2 |
| L1, L2, L1', L2' | electrode width of common electrode |
| S1a, S1b, S2a, S2b, S1a', S1b', S2a', S2b' | width of parallel slit |

What is claimed is:

1. A liquid crystal display device, comprising:
a first substrate;
a second substrate facing the first substrate; and
a liquid crystal layer sandwiched between the first substrate and the second substrate,
wherein the first substrate includes, in order, a plurality of pixel electrodes, an insulating film covering the plurality of pixel electrodes, and a common electrode layered over the plurality of pixel electrodes and having a plurality of parallel slits formed therein,
wherein a step that protrudes towards the liquid crystal layer and that faces the pixel electrode is formed in the first substrate in at least sides of regions between the plurality of pixel electrodes that are parallel to a lengthwise direction of the plurality of parallel slits,
wherein the common electrode covers at least a step face of the step, and
wherein the liquid crystal display device is a fringe field switching mode device,
wherein a height of the step is greater than or equal to 100 nm,
wherein the first substrate further includes a plurality of source bus lines formed in the regions between the plurality of pixel electrodes and an insulating film or films covering the plurality of source bus lines,
wherein a direction in which the source bus lines run is parallel to the lengthwise direction of the plurality of parallel slits, and
wherein each of the steps is in the insulating film or films that covers the plurality of source bus lines and the insulating film that covers the plurality of pixel electrodes.

2. The liquid crystal display device according to claim 1, wherein the height of the step is 150 nm to 600 nm.

3. The liquid crystal display device according to claim 2, wherein the height of the step is 200 nm to 400 nm.

4. The liquid crystal display device according to claim 1,
wherein the first substrate further includes a plurality of thin-film transistor elements arranged in the regions between the plurality of pixel electrodes,
wherein each of the plurality of thin-film transistor elements includes a semiconductor layer that contains an oxide semiconductor, and
wherein the plurality of pixel electrodes are arranged in the same layer as the semiconductor layers and are made from a material obtained by turning the oxide semiconductor into a conductor.

5. The liquid crystal display device according to claim 4, wherein the oxide semiconductor is made from indium, gallium, zinc, and oxygen.

6. A liquid crystal display device, comprising:
a first substrate;
a second substrate facing the first substrate; and
a liquid crystal layer sandwiched between the first substrate and the second substrate,
wherein the first substrate includes, in order, a plurality of pixel electrodes, an insulating film covering the plurality of pixel electrodes, and a common electrode layered over the plurality of pixel electrodes and having a plurality of parallel slits formed therein,
wherein a step that protrudes towards the liquid crystal layer and that faces the pixel electrode is formed in the first substrate in at least sides of regions between the plurality of pixel electrodes that are parallel to a lengthwise direction of the plurality of parallel slits,
wherein the common electrode covers at least a step face of the step, and
wherein the liquid crystal display device is a fringe field switching mode device,
wherein the first substrate further includes a plurality of gate bus lines formed in the regions between the plurality of pixel electrodes and an insulating film or films covering the plurality of gate bus lines, wherein a direction in which the gate bus lines run is parallel to the lengthwise direction of the plurality of parallel slits, and wherein each of the steps is in the insulating film or films that covers the plurality of gate bus lines and the insulating film that covers the plurality of pixel electrodes.

7. The liquid crystal display device according to claim 6, wherein a height of the step is greater than or equal to 100 nm.

8. The liquid crystal display device according to claim 7, wherein the height of the step is 150 nm to 600 nm.

9. The liquid crystal display device according to claim 8, wherein the height of the step is 200 nm to 400 nm.

10. The liquid crystal display device according to claim 6, wherein the first substrate further includes a plurality of thin-film transistor elements arranged in the regions between the plurality of pixel electrodes, wherein each of the plurality of thin-film transistor elements includes a semiconductor layer that contains an oxide semiconductor, and wherein the plurality of pixel electrodes are arranged in the same layer as the semiconductor layers and are made from a material obtained by turning the oxide semiconductor into a conductor.

11. The liquid crystal display device according to claim 10, wherein the oxide semiconductor is made from indium, gallium, zinc, and oxygen.

* * * * *